United States Patent Office 2,940,722
Patented June 14, 1960

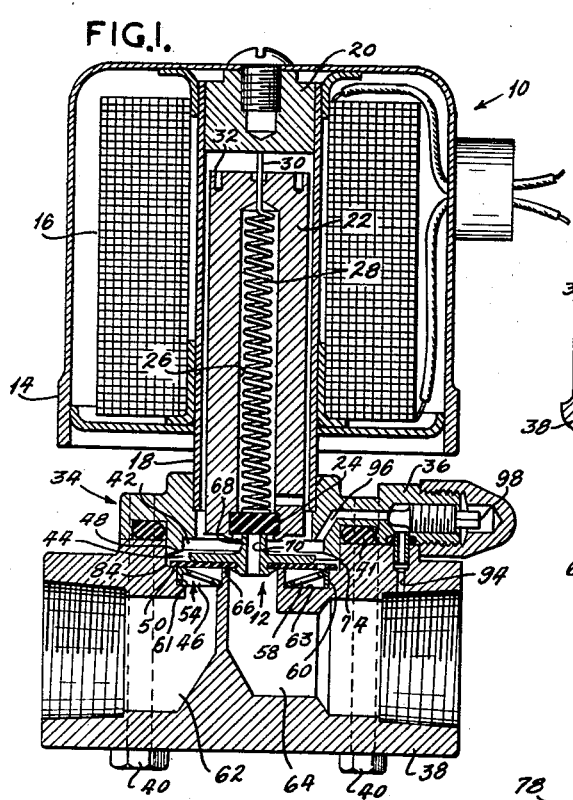

2,940,722

AMPLIFYING MEMBER AND CHAMBER CONSTRUCTION FOR PILOT-OPERATED VALVES

Frank J. Vargo, St. Louis County, Mo., assignor to Jackes-Evans Manufacturing Company, St. Louis, Mo., a corporation of Missouri Filed Dec. 9, 1955, Ser. No. 552,121

9 Claims. (Cl. 251—30)

The present invention relates to the valve art and more particularly to a novel amplifying member for a pilot-operated valve and to a novel construction of the chamber in which the amplifying member is positioned.

It is well known in the art that amplifying members in pilot-operated valves which consist of a support member and a flexible diaphragm have been constructed heretofore with the support member crimped onto a portion of the diaphragm. Any stretching or ballooning of a flexible diaphragm so crimped caused the crimped portion thereof to creep out of the support member from which the diaphragm may work loose, tear or fatigue, any one or combination of which will reduce the effectiveness of the amplifying member particularly when the amplifying member is loosely positioned in the valve.

It is an object of the present invention, therefore, to provide an improved amplifying member including a flexible diaphragm for a pilot-operated valve which diaphragm will not wear or leak due to repeated stretching.

Another object of the present invention is to provide an amplifying member including a flexible diaphragm for use in pilot-operated valves, the operational characteristics of which are capable of very accurate adjustment.

Another object of the present invention is to provide an amplifying member for use in pilot-operated valves which provides maximum sealing engagement with the associated valve members even though it is loosely positioned in the valve.

Another object of the present invention is to provide a flexible diaphragm for the amplifying member of a pilot-operated valve which provides extremely efficient sealing engagement with the support member therefor without being crimped or pinched.

Another object of the present invention is to provide means for preventing a flexible diaphragm portion of an amplifying member in pilot-operated valves from becoming distorted due to pressure reversals.

Another object of the present invention is to provide a flexible diaphragm for an amplifying member in a pilot-operated valve that continues to be sealed to the support member when subjected to large stretching forces.

Another object of the present invention is to provide an improved amplifying member including a flexible diaphragm for a pilot-operated valve, which is relatively inexpensive to construct and which has a longer useful life.

Another object of the present invention is to provide a chamber for an amplifying member in a pilot-operated valve that increases the flow area between the inlet and the outlet when the valve is open by permitting greater movement of the amplifying member.

Still another object of the invention is to provide a chamber for an amplifying member in a pilot-operated valve that loosely positions the amplifying member therein and yet makes the valve more reliable by providing means for reducing fluid leakage past the amplifying member.

Other objects and advantages of the present invention will become apparent in the detailed description of the particular embodiment chosen to illustrate the invention and in the accompanying drawing.

Briefly, the invention comprises an amplifying member and a chamber for the amplifying member for pilot-operated valves which amplifying member includes a support member and an annular diaphragm, said support member having an annular outwardly facing groove with a rounded inner groove wall for receiving the inner portion of the diaphragm, and said diaphragm having opposed surfaces which are freely movable in the groove and cornered inner edges for engaging the rounded inner groove wall. The inventive chamber for the amplifying member includes a tapered upper shoulder disposed above a level lower shoulder which tapered shoulder engages the amplifying member when the valve is open, and which level shoulder engages the amplifying member when the valve is closed.

In the drawing:

Fig. 1 is a vertical cross-sectional view of a pilot-operated valve, provided with an amplifying member and a chamber therefor constructed in accordance with the teachings of the present invention, the amplifying member being shown in the fully closed position, Fig. 2 is an enlarged fragmentary cross-sectional view of the pilot-operated valve of Fig. 1 showing the amplifying member in the open position, Fig. 3 is a further enlarged vertical cross-sectional view of the amplifying member per se, Fig. 4 is a vertical cross-sectional view of the flexible disc portion of the amplifier alone, Fig. 5 is a further enlarged fragmentary sectional view of the central portion of the amplifier member showing the flexible disc in the fully seated position, Fig. 6 is another enlarged fragmentary sectional view of the central portion of the amplifying member showing the flexible disc when it is being stretched, Fig. 7 is a top plan view of a disc support for use in a pilot-operated valve, and Fig. 8 is a vertical cross-sectional view taken along the line 8—8 of Fig. 7.

Referring to the drawing more particularly by reference numerals, 10 indicates generally a solenoid pilot-operated valve containing an amplifying member 12 embodying the improvements taught by the present invention.

The solenoid valve 10, which is for the most part of conventional construction, includes a housing 14 within which is mounted a solenoid coil 16. An enclosing or guiding tube 18 is fixedly mounted within the coil 16 and contains a closure member 20 at the upper end thereof.

Reciprocally mounted within the enclosing tube 18 is a plunger or armature 22 which has a resilient pilot valve member 24 at its lower end, for a purpose to appear.

A cavity 26 is contained in the armature 22, and a coil return spring 28 is positioned therein. The spring 28 has an upward projection 30 that extends beyond the upper end of the armature 22 and into contact with the bottom surface of the closure member 20. The armature 22 is provided with a shading band 32 to prevent chattering.

The body 34 of the valve is shown constructed of two pieces, 36 and 38, which are held together by machine screws 40. An annular resilient O ring or gasket 41 provides a seal between the pieces 36 and 38. The valve body 34 is shown situated below the enclosing tube 18 and contains a valve chamber which consists of three connecting portions numbered from top to bottom 42, 44 and 46. The upper and lower portions 42 and 46 are shown having cylindrical outer surfaces and the intermediate portion 44 is shown having a somewhat larger diameter and having an annular tapered surface or shoulder 48 at the top and an annular flat surface or shoulder 50 at the bottom.

An annular disc support 54 is positioned in the lower chamber portion 46. The disc support 54 (Figs. 1, 7 and 8) has an annular tapered surface 56 that is concave downwardly and is provided with spaced fluid ports or openings 58 (six being shown in Fig. 7). The outer edge of the tapered surface 56 is integral with a downwardly extending flange 60 which engages an outer wall 61 and an annular surface 63 of the lower chamber portion 46 when the disc support 54 is fitted into position.

A fluid inlet 62 is provided in the left end of the valve body 34. The inlet 62 extends to the right and upwardly to communicate with the annular lower chamber portion 46. A fluid outlet 64 is provided at the center of the valve body 34 for communication with the intermediate chamber portion 44. Surrounding the upper portion of the outlet 64 is an annular valve seat 66. Fluid leaving the valve through the outlet 64 moves downwardly through the valve seat 66 and to the right.

The amplifying member 12 is positioned within the valve chamber portions 42, 44 and 46, and includes a hub or body portion 68 which contains a central vertical pilot port 70. The upper end of the hub 68 provides a valve seat 72 which engages the resilient pilot valve member 24 when the valve solenoid coil 16 is de-energized. Formed integral with the hub 68 is a plate-like portion 74 which has a flat upper surface of diameter slightly smaller than the diameter of the upper chamber portion 42. The lower surface of the plate-like portion 74 has an annular flat central portion 76 with a rounded edge 78. Spaced below the flat portion 76 is a smaller plate-like portion 80 which is also formed integral with the hub 68 and which has a portion of its lower surface tapered to provide minimum resistance to fluid flow between the inlet 62 and the outlet 64 when the valve 10 is energized. An annular groove 82 is formed in the space between the plate-like portions 74 and 80. The groove 82 receives the central portion of the annular disc-like member 84 which is circular in shape and has a central opening defined by a wall 85 (Fig. 4). An outer surface 91 of the disc 84 extends substantially to the side of the chamber portion 44 between the shoulders 48 and 50. However, it is not necessary that the surface 91 touch the side of the chamber portion 44 because of the small amount of vertical distance the surface 91 has to move to make sealing engagement in going between the open and closed positions due to the taper of shoulder 48.

The annular groove 82, which is particularly important to the invention, has its innermost surface 83 rounded as is better shown in the enlarged view of Fig. 6. The groove 82 is sufficiently wide so that when the disc 84 is positioned therein, it does not pinch or bind on the upper and lower surfaces of the disc 84, and it is deep enough so that the disc 84 extends into engagement with the rounded inner surface 83. The wall 85 of the disc 84 has an upper edge 87 and a lower edge 89 which are deformed by engagement with the rounded surface 83 of the groove 82 (Figs. 4 and 5). The edges 87 and 89 are shown in their normally deformed position on the rounded surface 83 in Fig. 5, and in Fig. 6 the edges 87 and 89 are shown in the position they would assume if the disc 84 were stretched.

A pressure equalizer orifice 86 is provided in the disc 84 at a location outside the confines of the plate-like portion 74 for a purpose to be described later.

The disc 84 (Fig. 4) is constructed to have an upper and a lower layer 88 and 90, respectively, of rubber or some suitable substitute therefor, and a central layer 92 of a fiber or cloth base material.

A pressure relief passage including connecting passages 94 and 96 bypasses the amplifying member 12 and extends between the upper chamber portion 42 and the outlet 64 (Fig. 1). A threaded member 98 extends into sealing abutment with the end of passage 96 from the right to prevent fluid flow therein during normal operation of the valve 10. However, the member 98 can be backed out to place the chamber portion 42 in communication with the outlet 64, if desired.

*Operation*

The solenoid portion of the device operates in the conventional manner so that when the coil 16 is de-energized, the armature 22 is urged downwardly under the influence of the return spring 28 and gravity. In this de-energized position (Fig. 1), the pilot-operated valve 10 is closed. The flexible disc 84 which is backed up on top by the surface 76, engages the valve seat 66 to cut off direct communication between the chamber portions 42, 44 and 46 and the outlet 64, and the resilient pilot valve member 24 engages the valve seat 72 to block the upper end of the pilot port 70.

In the de-energized position, the flexible disc 84 is in a substantially flat condition with the lower side thereof resting on the flat annular surface or shoulder 50 and on the upper and outer portion of the disc support 54. The disc support 54 in addition to helping support the disc 84 serves to prevent the flexible member 84 from being sucked downwardly if the pressure at the inlet 62 and outlet 64 inadvertently becomes reversed.

When the solenoid coil 16 is energized, the armature 22 moves upwardly against the action of the return spring 28 and gravity. This movement frees the amplifying member 12 from its locked position between the seat 66 and the member 24. In normal usage when the valve 10 is closed, the fluid pressure at the inlet 62 is greater than the pressure at the outlet 64. Furthermore, in this position, the pressure in the chamber portions 42 and 44 above the amplifying member is the same as the pressure in the inlet 62 and the chamber 46 because of the equalizer orifice 86 therebetween. When the coil 16 is energized to cause the armature 22 to move upwardly (Fig. 2), the pressure above the amplifying member 12 is reduced by reason of the sudden flow of fluid from the upper chamber 42 through the open port 70. Manifestly, the port 70 is quite large in size in comparison with the equalizer orifice 86 and consequently a pressure difference occurs across the amplifying member as soon as the port 70 is opened. This pressure difference on opposite sides of the amplifying member 12 causes it to rise. In rising, the amplifying member 12 "hunts" a position of equilibrium in which the pressure above and below it remains at a more or less constant relationship, sufficient to support the amplifying member 12. Usually the upper position of the amplifying member 12 is close to the member 24, leaving a fairly large area of communication between the inlet 62 and the outlet 64.

It is important to note that the hub portion 68 of the amplifying member 12, in moving from the de-energized or closed position to the energized or open position, travels a larger distance than the outer surface 91 of the disc 84. This results because of the taper of the shoulder 48. This is important because it means that either the upper or lower surface of the disc 84 is engaged with one or the other of the shoulders 48 or 50 during a very large portion of the total valve actuating time. This reduces the fluid leakage and the accompanying pressure drop caused thereby across the disc 84 and increases the operating reliability of the valve 10.

The flexible disc 84 in moving upwardly to the energized position is bowed or flexed so that the center wall 85 is higher than the outer surface 91. Being flexed, the disc 84 makes a more positive seal with the tapered shoulder 48 when the valve is energized. It should also be noted that by having the shoulder 48 tapered, the effective flexing diameter of the disc 84 is increased since there is no sharp edge against which the disc can also be flexed. This further increases the flow area between the inlet 62 and the outlet 64 by permitting the amplifying member to move still further away from the seat 66.

The orifice 86 maintains a constant pressure relationship above and below the disc 84 to allow the amplifying member 12 to seek a position of equilibrium when the solenoid coil 16 is energized and the valve 10 is open. By reducing leakage past the outer edge of the disc 84, as described, greatly improved and more reliable operation is obtained by simply varying the size of the orifice 86. The size of the equalizer orifice 86 cannot be made too great relative to the size of the pilot port 70, otherwise it would be difficult to create sufficient pressure difference across the amplifying member 12 to raise and adequately support the amplifying member 12. Conversely, if the orifice 86 is too small the pressure will not be equalized fast enough which may cause the valve to open too fast and to be sluggish in closing.

During opening and closing of the valve there is a tendency for the disc 84 to be stretched or ballooned due to the sudden changes in pressure. The stretching effect pulls the inner wall 85 of the disc 84 outwardly in the groove 82 (Fig. 6). If the groove 82 were crimped to the flexible disc 84 as in prior valve constructions, two undesirable effects would be produced, both of which are overcome by the present construction. The first of the undesirable effects is the rubbing of the disc 84 on the faces of the groove 82 which wears down the disc 84 and causes additional leakage. The second undesirable effect is the tendency of the disc, where tightly held, to creep and eventually work loose from the amplifying member 12. Both of these effects occur when the disc 84 is crimped in position on the amplifying member 12. In cases where the disc 84 creeps loose from the amplifying member 12, additional undesirable effects have been produced, such for example as permanently flexing the disc 84 and thereby creating a leaky condition at the edges thereof. A permanently flexed disc also has a tendency to chatter and be very noisy.

To overcome these undesirable effects, the improvements taught by this invention have been incorporated into the amplifying member 12. First, the groove 82 in the amplifying member 12 is constructed wide enough to provide for free sliding movement of the disc 84 relative to groove 82, thereby enabling the disc 84 to move inwardly and outwardly of the groove 82 without losing its original shape and without rubbing. Secondly, the groove 82 is provided with a rounded inner wall or surface 83 for engaging the inner wall 85 and the edges 87 and 89 thereof of the disc 84. The edges 87 and 89 are normally deformed against the rounded wall 83 of the groove 82 and provide sealing engagement therewith (Fig. 5). When the disc 84 is stretched (Fig. 6), the inner wall 85 moves away from the rounded wall 83 of the groove 82 but the seal between the disc 84 and the groove 82 remains effective even at very large ballooning pressures because of the amount of rise available at the edges 87 and 89 to compensate for the stretching. Therefore, the edges 87 and 89 will continue to engage the rounded wall of the groove 82. As soon as the ballooning forces cease, the disc 84 fully reseats itself into the groove 82 without rubbing or sticking and, therefore, has no tendency to come loose or permanently flex and fatigue.

Thus it is apparent that there has been provided a novel amplifying member and a novel chamber construction for pilot-operated valves, which fulfill all of the objects and advantages sought therefor.

The foregoing description and the accompanying drawing have been presented only by way of illustration and example, and changes and alterations in the present disclosure, which will be readily apparent to one skilled in the art, are contemplated as within the scope of the present invention which is limited only by the claims which follow.

What I claim is:

1. In a valve housing having an inlet and outlet adapted to be connected to fluid conduits: a chamber positioned to provide fluid flow communication between the inlet and the outlet, said chamber having a valve seat associated with the outlet, a flat peripheral chamber shoulder around said valve seat, and a tapered peripheral shoulder disposed in the chamber in opposed spaced relationship to the flat chamber shoulder; an amplifying member and a support member positioned within the chamber, said amplifying member being movable between an open position away from the valve seat and in engagement with the tapered peripheral shoulder and a closed position in which the amplifying member cooperates with the valve seat, with the flat peripheral shoulder, and with said support member; said support member including a tapered wall in side-by-side contact with said flat peripheral shoulder and having openings therein for communicating the chamber with the valve housing inlet.

2. In the valve housing defined by claim 1 said amplifying member includes a flexible member that engages the tapered peripheral shoulder and the flat peripheral shoulder at different angles depending on whether the amplifying member is in the open or closed position.

3. In a solenoid operated valve housing having an inlet and an outlet adapted to be connected to fluid conduits; a chamber having separate ports to communicate with the inlet and the outlet; a valve seat associated with the outlet port; an amplifying member freely positioned within said chamber and movable into and out of engagement with the valve seat, said amplifying member including a hub portion having a passage therethrough, a second valve seat located on the hub portion and associated with the hub passage, a plate-like portion on the amplifying member extending outwardly from the hub portion, a groove in the hub portion adjacent to the plate-like portion defined by spaced opposed groove walls connected by an annular inner surface, said inner surface having a minimum diameter at an intermediate location between said spaced walls and larger diameter portions adjacent to the spaced walls, and a resilient flexible diaphragm mounted in the groove on the hub portion adjacent the plate-like portion and sealably engageable with the valve seat when the valve is closed, said diaphragm having a cylindrical opening therein which engages the annular inner surface, said opening having a diameter substantially equal to the minimum diameter portion of the annular inner surface, and said opposed groove walls being spaced apart to have free sliding engagement with the diaphragm so that the diaphram can move radially relative thereto without binding thereon.

4. In a valve assembly having a valve chamber with an outlet opening therefrom and an inlet opening thereto in concentric relation to the outlet opening, the openings constituting valve seats at one side of the valve chamber and the other side of the valve chamber supporting a valve controlling device: the improvement which comprises a valve assembly freely movably disposed in the valve chamber for movement between a position sealing the outlet opening from the inlet opening while permitting communication between the inlet opening and the rest of the valve chamber and a position allowing communication between the inlet and outlet openings; said valve assembly consisting in a body having a projection thereon formed with an undercut annular groove having spaced walls connected adjacent to the bottom of the groove by an annular groove surface, said annular groove surface having a minimum diameter portion intermediate said spaced groove walls and larger diameter portions adjacent to said spaced walls, and an elastic flexible diaphragm carried by said body and having a cylindrical mounting aperture therein, said aperture having a diameter substantially equal to the minimum diameter of the annular groove surface and having a thickness approximately equal to the distance between the spaced groove walls, said diaphragm aperture adapted to be stretched over said projection and contract into said groove so that a portion of the diaphragm aperture is normally compressed into engagement with the larger diameter portions of the annular groove surface, and said diaphragm being free to move radially relative to the spaced groove walls without binding thereon.

5. In a valve housing having a chamber therein and an inlet and an outlet communicating with the chamber, said chamber having a pair of spaced surfaces and a valve seat associated with the outlet; an amplifying member positioned within the chamber and movable between an open position away from the valve seat and a closed position in which it cooperates with the valve seat, the amplifying member including a support member and a flexible elastic diaphragm, said support member having an outside groove in which the diaphragm is positioned, said groove being defined by spaced walls and an inner groove wall connecting said spaced groove walls, said inner groove wall being annular and having a rounded cross section providing a minimum groove diameter at a location intermediate said spaced groove walls, said diaphragm having a width substantially equal to the distance between the spaced groove walls and a cylindrical opening having a diameter substantially equal to the minimum groove diameter, said diaphragm opening being positioned in the groove whereby a portion of said diaphragm adjacent the opening therein is normally compressed by engagement with the inner groove wall to form a seal therewith, and said diaphragm being free to move radially relative to the spaced groove walls without binding thereon, said diaphragm extending from said groove to a position between said pair of spaced chamber surfaces and having a free edge movably positioned between the spaced chamber surfaces.

6. In combination, a valve housing having an inlet and outlet adapted to be connected to fluid conduits; a chamber positioned to provide fluid flow communication therebetween, said chamber having a valve seat associated with the outlet and a tapered peripheral shoulder formed on the upper chamber surface; an amplifying member positioned within the chamber and movable between an open position away from the valve seat and in engagement with the tapered peripheral shoulder and a closed position in which the amplifying member cooperates with the valve seat, said amplifying member including an annular resilient flexible diaphragm and a hub member, said hub member having an outside groove thereon in which the diaphragm is mounted, said groove being defined by spaced apart walls having a spacing approximately equal to the thickness of the diaphragm between which the diaphragm can move radially relative to the groove without binding thereon, an annular surface connecting the spaced groove walls, said annular surface having a minimum diameter portion and at least one portion with a relatively greater diameter, said larger diameter portion being adjacent to one of said spaced groove walls, said diaphragm having a cylindrical opening with a diameter approximately equal to the minimum groove diameter, said opening being positioned in the groove such that a portion of said diaphragm adjacent to said opening is normally compressed into engagement with the larger diameter portion of the groove, said diaphragm extending from the groove and having an unattached portion adjacent to the tapered chamber shoulder that has free limited movement into and out of engagement with said tapered peripheral chamber shoulder.

7. An amplifying member for a pilot-operated valve comprising a central member having a continuous outside surface with a groove therein, said groove having a rounded inner surface and spaced sides extending from the rounded inner surface to the outside surface of said member; said rounded inner groove surface having a relatively small diameter portion and at least one relatively larger diameter portion, and a resilient flexible disc-like member having opposed surfaces and a hole therethrough which is defined by a wall perpendicular to the major plane of the disc, the diameter of said hole being approximately the same as the diameter of the relatively small diameter portion of the rounded inner groove surface, said disc-like member being mounted in said groove such that the wall of the hole in the disc-like member and the adjacent portions of the opposed surfaces of the disc-like member are compressed by engagement with said relatively large diameter portion of said rounded groove surface to seal said diaphragm to said central member, and said diaphragm being free to move radially relative to the spaced sides of the groove without binding thereon.

8. The amplifying member for a pilot-operated valve set out in claim 7 wherein said disc-like member is elastic and said opposed surfaces thereof are spaced to be in free sliding engagement with the spaced sides of the mounting groove therefor.

9. In a valve structure having a diaphragm, the improvement of mounting means for the diaphragm comprising a mounting member having an outside groove defined by spaced groove surfaces and an inner annular groove surface connected between said spaced surfaces, said inner groove surface having a minimum diameter portion and at least one portion with a larger diameter, and a flexible resilient diaphragm having a thickness approximately equal to the spacing between the spaced groove surfaces and a cylindrical opening adapted to be positioned adjacent to the inner groove surface, said diaphragm opening having an unstressed diameter approximately equal to the minimum diameter portion of the annular inner groove surface so that when the diaphragm is mounted in the groove a portion thereof adjacent to the larger diameter portion of the inner groove surface is normally compressed into sealing engagement therewith, and said diaphragm being free to move radially relative to the spaced groove surfaces without binding thereon.

References Cited in the file of this patent

UNITED STATES PATENTS

| 265,112 | Lord | Sept. 26, 1882 |
| 1,269,721 | Kuntny | June 18, 1918 |
| 1,570,830 | Hagey et al. | Jan. 26, 1926 |
| 1,587,516 | Forfar | June 8, 1926 |
| 1,783,281 | Cox | Dec. 2, 1930 |
| 2,020,833 | Hansen | Nov. 12, 1935 |
| 2,086,868 | Hall | July 13, 1937 |
| 2,319,578 | Beckley | May 18, 1943 |
| 2,544,056 | Stortz | Mar. 6, 1951 |
| 2,738,157 | Vargo | Mar. 13, 1956 |

FOREIGN PATENTS

| 2,650 | Great Britain | Dec. 16, 1854 |
| 14,189 | Great Britain | June 23, 1904 |
| 624,639 | Great Britain | June 14, 1949 |
| 690,897 | Great Britain | Feb. 11, 1952 |